US012761671B2

(12) United States Patent
Yasunami et al.

(10) Patent No.: US 12,761,671 B2
(45) Date of Patent: Oct. 13, 2026

(54) TRANSPORT VEHICLE SYSTEM

(71) Applicant: Murata Machinery, Ltd., Kyoto (JP)

(72) Inventors: Kentaro Yasunami, Ise (JP); Kohei Sadano, Yokohama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 19/114,656

(22) PCT Filed: Jul. 18, 2023

(86) PCT No.: PCT/JP2023/026290
§ 371 (c)(1),
(2) Date: Mar. 24, 2025

(87) PCT Pub. No.: WO2024/070146
PCT Pub. Date: Apr. 4, 2024

(65) Prior Publication Data

US 2026/0104720 A1 Apr. 16, 2026

(30) Foreign Application Priority Data

Sep. 26, 2022 (JP) ................................ 2022-152373

(51) Int. Cl.
*G05D 1/698* (2024.01)
*G05D 1/225* (2024.01)
*G05D 105/28* (2024.01)

(52) U.S. Cl.
CPC ........... *G05D 1/6987* (2024.01); *G05D 1/225* (2024.01); *G05D 2105/28* (2024.01)

(58) Field of Classification Search
CPC .................. B65G 1/137; B65G 1/0457; B65G 2201/0235; G05D 1/02; G05D 1/225; G05D 1/698; G05D 1/6987
(Continued)

(56) References Cited

U.S. PATENT DOCUMENTS 11,181,906 B2 * 11/2021 Yasunami ............ G05D 1/0297
2018/0229936 A1 8/2018 Motoori
(Continued)

FOREIGN PATENT DOCUMENTS

JP 63-116215 A 5/1988
JP 4-129918 A 4/1992
(Continued)

OTHER PUBLICATIONS

International Preliminary Report on Patentability dated Apr. 10, 2025, from counterpart International Patent Application No. PCT/JP2023/026290.
(Continued)

*Primary Examiner* — Andrew Joseph Rudy
(74) *Attorney, Agent, or Firm* — DLA Piper LLP (US)

(57) ABSTRACT

A transport vehicle system includes a plurality of transport vehicles, a plurality of stations, and a controller. The controller executes exchange determination determining whether in an upstream side of a first transport vehicle assigned with a transport instruction that designates a first station as a movement destination, a second transport vehicle assigned with a transport instruction that designates a second station disposed downstream of the first station as a movement destination is present, and when determining that the second transport vehicle is present upstream of the first transport vehicle, executes exchange control exchanging the movement destinations of the transport instructions assigned before the exchange determination with each other between the first transport vehicle and the second transport vehicle.

18 Claims, 5 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2021/0149401 | A1 | 5/2021 | Kitamura | |
| 2025/0206532 | A1* | 6/2025 | Kitamura | ............ B65G 1/0457 |

FOREIGN PATENT DOCUMENTS

| | | | |
|---|---|---|---|
| JP | 2002-6951 | A | 1/2002 |
| JP | 2002-332105 | A | 11/2002 |
| JP | 2014-115726 | A | 6/2014 |
| JP | 7006775 | B2 | 1/2022 |
| TW | 550222 | B | 9/2003 |
| WO | 2017/029873 | A1 | 2/2017 |

OTHER PUBLICATIONS

International Search Report dated Oct. 10, 2023, of counterpart International Application No. PCT/JP2023/026290, along with an English translation.

* cited by examiner

TRANSPORT VEHICLE SYSTEM

CROSS REFERENCE TO RELATED APPLICATIONS

This application is a US national stage filing under 35 U.S.C. § 371 of International Application No. PCT/JP2023/026290, filed Jul. 18, 2023, which claims priority to Japanese Patent Application No. 2022-152373 filed Sep. 26, 2022, each of which is incorporated herein by reference in its entirety.

TECHNICAL FIELD

This disclosure relates to a transport vehicle system.

BACKGROUND

A transport vehicle system (for example, WO 2017/029873) is known in which transport vehicles transporting containers such as front opening unified pods (FOUPs) and reticle pods storing stored objects such as semiconductor wafers and glass substrates travel along a track. The transport vehicle system includes a plurality of transport vehicles traveling on a route in which their traveling direction is set to one direction. Each of the transport vehicles is configured to move based on a transport instruction assigned by a controller. The transport instruction includes movement destination information about a station issued a loading request. In such a transport vehicle system, each time a transport request occurs in one station, a transport instruction including the one station as the movement destination information is generally assigned to a transport vehicle capable of reaching earliest the one station.

However, in the general control described above, as illustrated in State 5A in FIG. 5, when a transport instruction that designates a first station STa as a movement destination is assigned to a first transport vehicle 105A traveling on a track 111, a transport instruction that designates a second station STb disposed downstream of the first station STa as a movement destination is assigned to a second transport vehicle 105B, and the first transport vehicle 105A will travel downstream of the second transport vehicle 105B, the following problem may occur. That is, as illustrated in State 5B in FIG. 5, while the first transport vehicle 105A is executing a transfer operation receiving an article from the first station STa, the second transport vehicle 105B has to wait until the transfer operation by the first transport vehicle 105A is completed behind (upstream of) the first transport vehicle 105A. After the waiting described above, as illustrated in State 5C in FIG. 5, the second transport vehicle 105B executes a transfer operation at the second station STb as the movement destination. Such a waiting time of a following transport vehicle (the second transport vehicle 105B) reduces the transport efficiency of the transport vehicle system.

It could therefore be helpful to provide a transport vehicle system capable of improving the transport efficiency of the transport vehicle system by reducing a waiting time of a following transport vehicle due to a transfer operation by a preceding transport vehicle.

SUMMARY

A transport vehicle system includes a plurality of transport vehicles configured to travel along a route set in advance in one direction and to transport an article, a plurality of stations provided along the route and configured to serve as a loading request source for the article, and a controller configured to assign a transport instruction each time a loading request for the article occurs, the transport instruction designating a station being one of the plurality of stations having the loading request as a movement destination with respect to the transport vehicle capable of reaching the station having the loading request earliest, the controller executes an exchange determination determining whether a second transport vehicle is present upstream of a first transport vehicle, the first transport vehicle being one of the plurality of transport vehicles assigned with a transport instruction that designates a first station being one of the plurality of stations as a movement destination, and the second transport vehicle being one of the plurality of transport vehicles different from the first transport vehicle and assigned with a transport instruction designating a second station being one of the plurality of stations disposed downstream of the first station as a movement destination, and executes an exchange control exchanging the movement destination of the transport instruction for the first transport vehicle and the movement destination of the transport instruction for the second transport vehicle assigned before the exchange determination with each other when determining that the second transport vehicle is present upstream of the first transport vehicle.

The transport vehicle system can reduce a time occurring when the transport instructions are not exchanged, that is, a time during which the second transport vehicle waits behind (upstream of) the first station while the first transport vehicle is executing a transfer operation receiving the article from the first station by exchanging the transport instructions. In addition, when another transport vehicle is present behind a following transport vehicle, the number of times of waiting of the transport vehicle is reduced by one to reduce its waiting time, thereby also reducing the length of a waiting vehicle queue, and thus the transport efficiency of the entire transport system more improves. For example, when there is a branching point upstream of the station, the waiting vehicle queue is shortened, thereby reducing the possibility of involving a vehicle expected to branch in the vehicle queue. Consequently, the transport efficiency of the transport vehicle system can be improved.

The exchange determination by the controller may determine whether the second transport vehicle destined to wait upstream of the first transport vehicle until work by the first transport vehicle is completed is present when the first transport vehicle executes the transport instruction that designates the first station as the movement destination. This configuration enables the second transport vehicle to surely eliminate a waiting time during a transfer operation in which the first transport vehicle positioned ahead receives the article from the station. Furthermore, the first transport vehicle does not significantly fall behind an original estimated time scheduled to complete execution, and the second transport vehicle executes the transport instruction that designates the first station as the movement destination.

The exchange determination by the controller may determine whether the second transport vehicle capable of starting a transfer operation at the first station while the first transport vehicle is performing a transfer operation at the second station is present when the movement destination of the transport instruction for the first transport vehicle and the movement destination of the transport instruction for the second transport vehicle assigned before the exchange determination are exchanged with each other.

The controller may execute the exchange control when determining that the second transport vehicle is present upstream of the first transport vehicle by the exchange determination even where another transport vehicle is present between the first transport vehicle and the second transport vehicle. This configuration can execute the exchange control even when the second transport vehicle is not positioned immediately behind the first transport vehicle, and thus a searching range for the transport vehicle to be exchanged can be expanded, and the transport vehicle to be exchanged is easily found.

The controller may execute the exchange determination when the first transport vehicle assigned with the transport instruction that designates the first station as the movement destination reaches a certain position upstream of the first station, and the certain position may be a deceleration starting position for when the first transport vehicle is to stop at the first station. This configuration can stop the first transport vehicle at the first station as it is when the second transport vehicle to be exchanged is not present behind the first transport vehicle. In addition, the time at which the exchange control is executed can be delayed until just before the first transport vehicle can be stopped at the first station, and the second transport vehicle is easily found. Furthermore, a load on the controller can be reduced compared to the presence or absence of the second transport vehicle is constantly determined.

We can improve the transport efficiency of the transport vehicle system by reducing a waiting time of a following transport vehicle due to a transfer operation by a preceding transport vehicle.

REFERENCE SIGNS LIST

Figure 1:
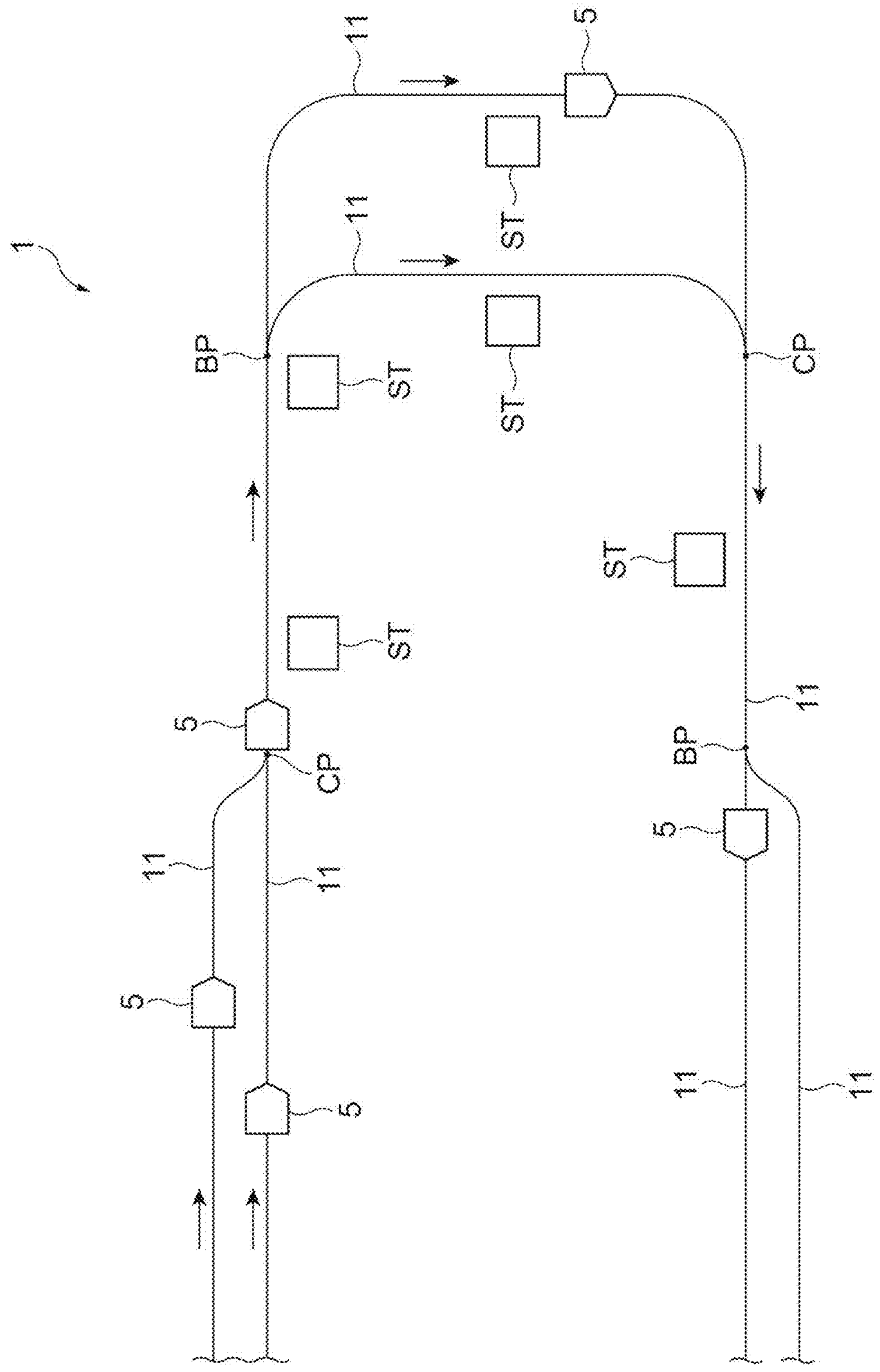
FIG. 1 is a configuration diagram illustrating a configuration of a transport vehicle system according to an embodiment.

1 Transport vehicle system
3 Transport vehicle controller (controller)
5 Transport vehicle
5A First transport vehicle
5B Second transport vehicle
11 Track
40 Transport vehicle controller
P Certain position
ST Station
STa First station
STb Second station

DETAILED DESCRIPTION

The following describes an embodiment with reference to the accompanying drawings. In the description of the drawings, the same elements are denoted by the same symbols, and redundant descriptions are omitted. The dimensional proportions in the drawings do not necessarily match those in the description. Upstream and downstream when describing the embodiment mean upstream and downstream in the traveling direction (the arrow direction indicated in a track 11 illustrated in FIG. 1: one direction) of an overhead transport vehicle (a transport vehicle) 5 set in advance (hereinafter simply referred to as the "transport vehicle 5").

This transport vehicle system 1 is a system for transporting FOUPs using the transport vehicle 5 capable of moving along the track 11. The transport vehicle 5 is an unmanned transport vehicle and is, for example, an overhead transport vehicle, a tracked cart, or the like. The following describes as an example the transport vehicle system 1 in which in a building such as a factory the transport vehicle 5 travels along the one-way track 11 laid on the ceiling or the like of the building. As illustrated in FIG. 1, the transport vehicle system 1 mainly includes the track 11, a plurality of stations ST, a plurality of the transport vehicles 5, and a transport vehicle controller (a controller) 3.

The track 11 is a member causing the transport vehicle 5 to travel and is hung from the ceiling. FIG. 1 illustrates an example of part of a layout of the track 11 in this embodiment. The track 11 of this embodiment is set such that the transport vehicle 5 travels in one direction in the arrow direction illustrated in FIG. 1. The track 11 is provided with branch points BP for branching the track 11 and confluence points CP for merging the track 11.

The stations ST are provided facing the track 11 along the track 11. In this embodiment, a plurality of stations ST are provided. The station ST is a part at which a FOUP is delivered to and from the transport vehicle 5. Examples of the station ST in, for example, semiconductor processing factories include a load port delivering the FOUP (an article) between a semiconductor processing apparatus and the transport vehicle 5 and a buffer at which the transport vehicle 5 can temporarily place the FOUP. The station ST is a loading request source for the FOUP.

Figure 2:
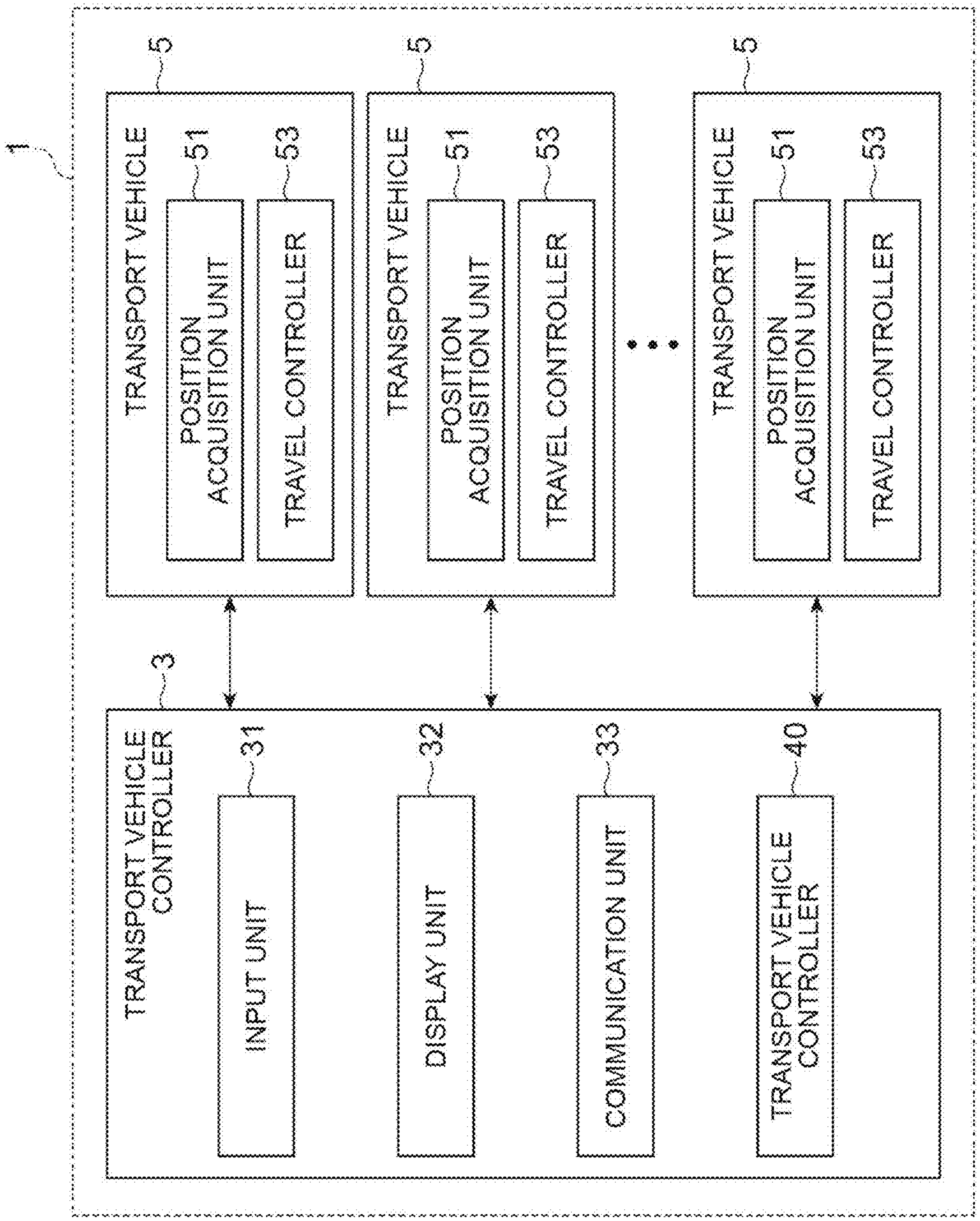
FIG. 2 is a functional block diagram illustrating a functional configuration of the transport vehicle system.

As illustrated in FIG. 2, the transport vehicle controller 3 includes an input unit 31, a display unit 32, a communication unit 33, and a transport vehicle controller 40. The input unit 31 includes, for example, a keyboard, a mouse, and the like and is a part receiving input of various kinds of operations and various kinds of setting values by a user. In this embodiment, information on a certain position P, which will be described in detail below, is input from the input unit 31 and set. The display unit 32 includes, for example, a liquid crystal display or the like and is a part displaying various kinds of setting screens and displaying input screens or the like receiving input via the input unit 31 or the like. The input unit 31 and the display unit 32 are not required to be provided integrally with the transport vehicle controller 3 and can be replaced by terminal devices that can communicate with each other.

The communication unit 33 is a part performing communication with other devices or the like and, for example, transmits a transport instruction to the transport vehicle 5 or receives information on the current position of the transport vehicle 5 (position data) via a wireless communication network. The communication unit 33 also receives a transport instruction including information on the station ST as a movement destination from an upper controller via, for example, a local area network (LAN). That is, the upper controller transmits information on the station ST with a transport request to the transport vehicle controller 3.

The transport vehicle controller 40 is a part executing various kinds of control processing in the transport vehicle system 1, which will be described in detail below, and includes, for example, a central processing unit (CPU), a read only memory (ROM), a random access memory (RAM), and the like. As illustrated in FIG. 2, the transport vehicle controller 40 can be configured as software in which a computer program stored in the ROM is loaded onto the RAM and executed by the CPU, for example. The transport vehicle controller 40 may be configured as hardware formed of electronic circuitry or the like.

The transport vehicle controller 40 assigns a transport instruction to the transport vehicle 5 based on information on the station ST issued a loading request transmitted from, for example, the upper controller (not illustrated). More specifically, the transport vehicle controller 40, each time a FOUP loading request occurs, assigns a transport instruction that designates the station ST issued the loading request as a movement destination to the transport vehicle 5 capable of reaching earliest the station ST issued the loading request and not assigned with another transport instruction (including a transport instruction other than the loading request). In addition, the transport vehicle controller 3 grasps the position of the transport vehicle 5 based on position information (which will be described in detail below) transmitted from each of the transport vehicles 5 regularly or continuously. When the following simply refers to the "transport instruction," it refers to the transport instruction that designates the station ST issued the loading request as the movement destination unless specially referred to.

Figure 3:
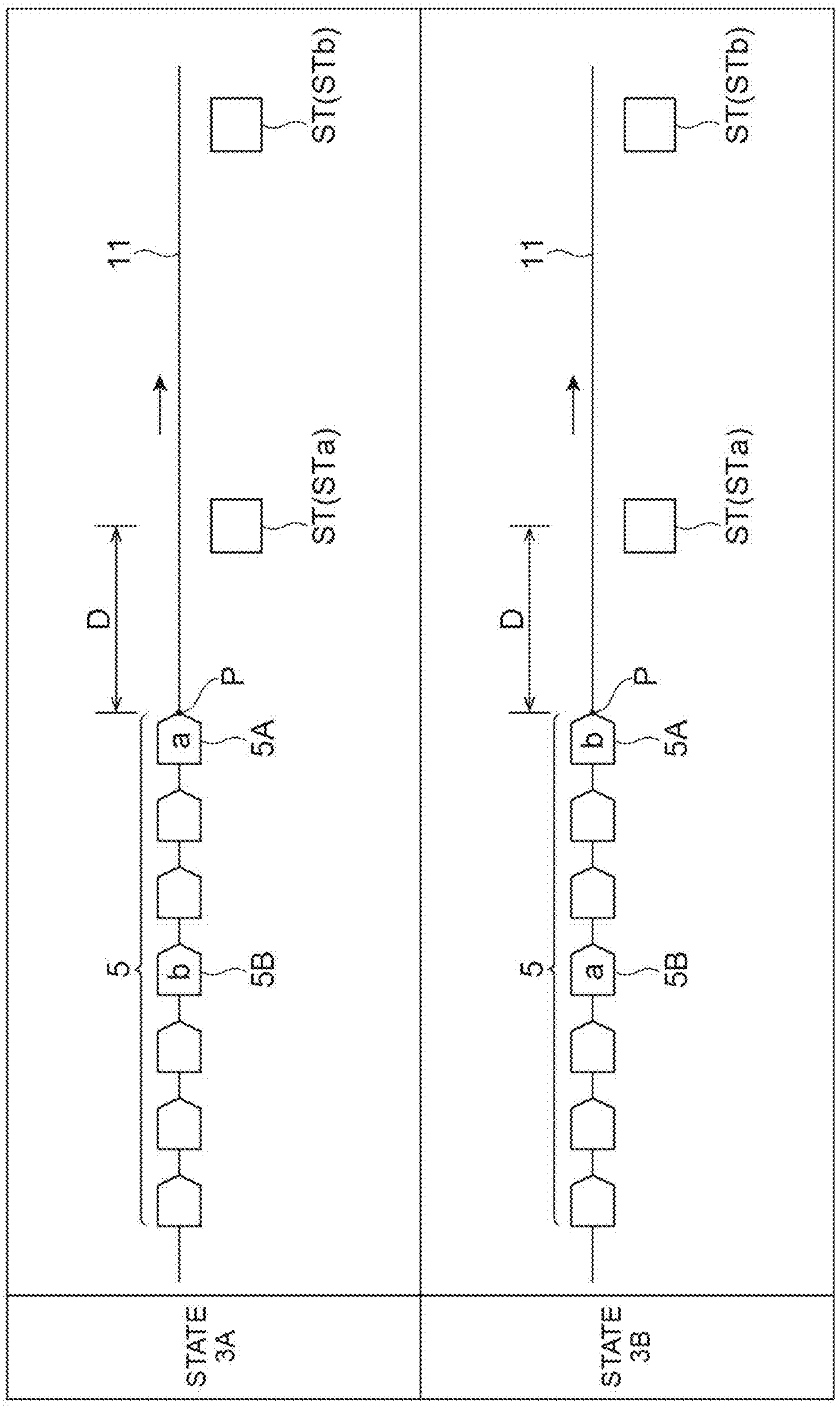
FIG. 3 is a diagram for illustrating exchange determination and exchange control in the transport vehicle system.

As illustrated in State 3A illustrated in FIG. 3, the transport vehicle controller 40 executes exchange determination and exchange control. The exchange determination is determination whether, when a first transport vehicle 5A being one of the transport vehicles 5 assigned with a transport instruction that designates a first station STa being one of the stations ST as a movement destination reaches the certain position P upstream of the first station STa, a second transport vehicle 5B being the transport vehicle 5 different from the first transport vehicle 5A assigned with a transport instruction that designates a second station STb being the station ST disposed downstream of the first station STa as a movement destination is present upstream of the first transport vehicle 5A. "a" in the transport vehicles 5 illustrated in FIG. 3 to FIG. 5 means that they are assigned with the transport instruction that designates the first station STa as the movement destination, and "b" in the transport vehicles 5 means that they are assigned with the transport instruction that designates the second station STb as the movement destination.

The certain position P is a position separated from the first station STa upstream by a distance D. More specifically, the certain position P is a deceleration starting position for when the first transport vehicle 5A is to stop at the first station STa. In other words, if starting deceleration at the certain position P, the first transport vehicle 5A can be to stop at the first station STa.

The exchange control is control exchanging the movement destination of the transport instruction for the first transport vehicle and the movement destination of the transport instruction for the second transport vehicle assigned before the exchange determination with each other between the first transport vehicle 5A and the second transport vehicle 5B when it is determined that the second transport vehicle 5B is present upstream of the first transport vehicle 5A. For example, as illustrated in State 3A illustrated in FIG. 3, when the exchange control is executed when the transport instruction that designates the first station STa as the movement destination is assigned to the first transport vehicle 5A and the transport instruction that designates the second station STb as the movement destination is assigned to the second transport vehicle 5B, as illustrated in State 3B illustrated in FIG. 3, the transport instruction that designates the second station STb as the movement destination is reassigned to the first transport vehicle 5A and the transport instruction that designates the first station STa as the movement destination is reassigned to the second transport vehicle 5B.

The exchange determination by the transport vehicle controller 40 determines whether in State 3A illustrated in FIG. 3 the second transport vehicle 5B capable of reaching the first station STa before the first transport vehicle 5A completes the transport instruction that designates the first station STa as the movement destination is present. In other words, the exchange determination determines whether the second transport vehicle 5B destined to wait upstream of the first transport vehicle 5A until work by the first transport vehicle 5A is completed is present when the first transport vehicle 5A executes the transport instruction that designates the first station STa as the movement destination. The transport vehicle controller 40 executes the exchange control when determining that the second transport vehicle 5B described above is present and does not execute the exchange control when determining that the second transport vehicle 5B is not present.

The exchange control by the transport vehicle controller 40 may determine whether the second transport vehicle 5B capable of starting a transfer operation at the first station STa while the first transport vehicle 5A is performing a transfer operation at the second station STb is present when the movement destinations of the transport instructions assigned before the exchange determination are exchanged with each other.

Figure 4:
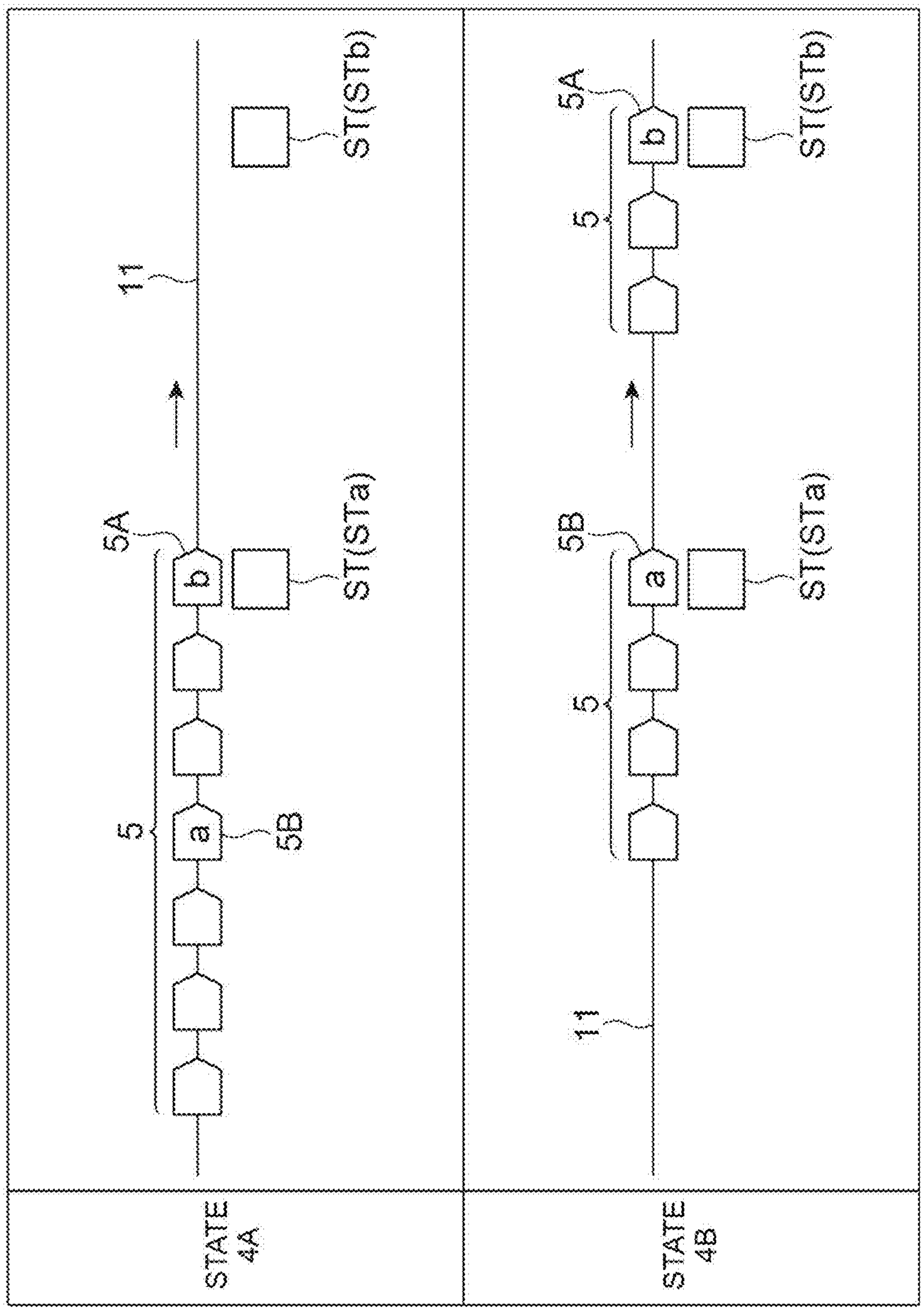
FIG. 4 is a diagram for illustrating the exchange determination and the exchange control in the transport vehicle system.
Figure 5:
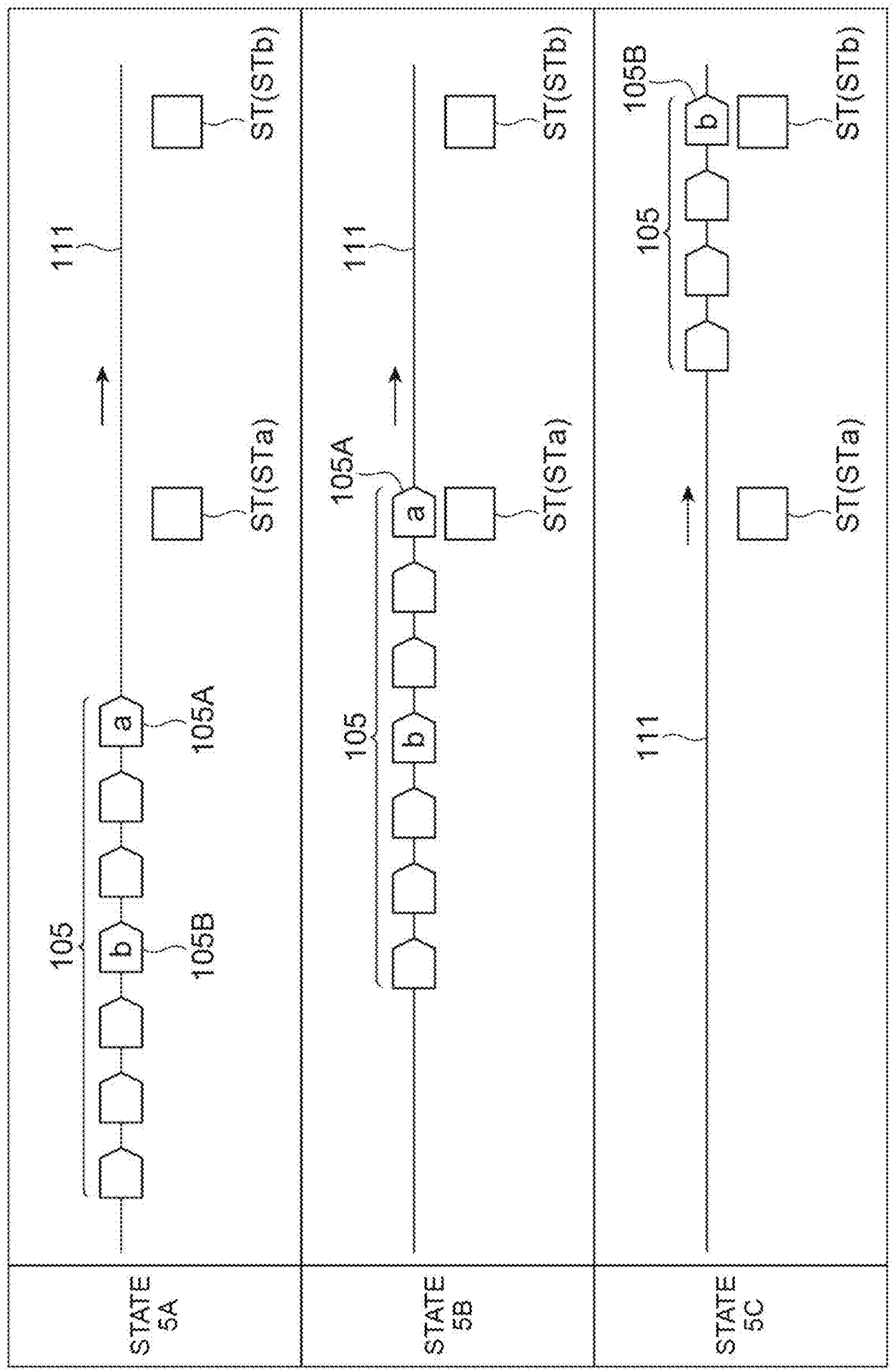
FIG. 5 is a diagram for illustrating a problem occurring in a conventional transport vehicle system.

In such determination, when the exchange control described above is executed, as illustrated in State 4B illustrated in FIG. 4, part of the time during which the second transport vehicle 5B is performing the transfer operation at the first station STa can be overlaid on part of the time during which the first transport vehicle 5A is performing the transfer operation at the second station STb. This can eliminate a waiting time during a transfer operation in which the first transport vehicle 5A positioned ahead of the second transport vehicle 5B receives the FOUP from the station ST. Note that the time during which the first transport vehicle 5A is performing the transfer operation at the second station STb and the time during which the second transport vehicle 5B is performing the transfer operation at the first station STa may completely match each other.

The transport vehicle controller 40, when determining that the second transport vehicle 5B is present upstream of the first transport vehicle 5A by the exchange determination described above, executes the exchange control even when another transport vehicle 5 is present (two are present in this embodiment) between the first transport vehicle 5A and the second transport vehicle 5B, for example, as in State 3A illustrated in FIG. 3. The other transport vehicle 5 referred to in this example is, for example, a transport vehicle not assigned with any transport instruction, a transport vehicle assigned with a transport instruction to other than the station for the exchange determination (the second station STb), a transport vehicle not holding the FOUP, or the like.

The transport vehicle 5 is configured to be able to transfer the FOUP. As illustrated in FIG. 2, the transport vehicle 5 includes a position acquisition unit 51 and a travel controller 53 apart from a mechanism traveling along the track 11 and a known mechanism transferring the FOUP.

The position acquisition unit 51 is a part acquiring the position information of its own vehicle on the track 11. The position acquisition unit 51 may include, for example, a reading unit reading a bar code or the like attached to the track 11 and on which the position information is displayed, an encoder, and the like. The position acquisition unit 51 transmits point information obtained by the reading unit and a distance traveled after passing through the point obtained from the encoder to the transport vehicle controller 3 as the position information. The information acquired by the position acquisition unit 51 is transmitted to the transport vehicle controller 3 in response to regular or continuous inquiry from the transport vehicle controller 3.

The travel controller 53 is a part controlling the travel of the transport vehicle 5 and is, for example, an electronic control unit including a CPU, a ROM, a RAM, and the like. The travel controller 53 controls the travel of the transport vehicle 5 based on a transport instruction transmitted from the transport vehicle controller 3. A transport instruction transmitted from the upper controller (not illustrated) includes information on the station ST issued the loading request as the movement destination. The travel controller 53 controls the mechanisms so as to move to the station ST issued the loading request that is the movement destination included in the transport instruction and to receive the FOUP.

The transport instruction transmitted from the transport vehicle controller 3 may include information on the station ST as a transport destination of the FOUP. The travel controller 53 controls the mechanisms so as to move to the station ST as the transport destination.

The following describes the operation of the transport vehicle system 1 when the exchange determination and the exchange control described above are executed.

As illustrated in State 3A in FIG. 3, the transport vehicle controller 3 (the transport vehicle controller 40) executes the exchange determination when the first transport vehicle 5A assigned with the transport instruction that designates the first station STa issued the loading request as the movement destination reaches the certain position P upstream of the first station STa. If determining that the second transport vehicle 5B assigned with the transport instruction that designates the second station STb as the movement destination is present upstream of the first transport vehicle 5A assigned with the transport instruction that designates the first station STa as the movement destination, as illustrated in State 3B in FIG. 3, the transport vehicle controller 3 exchanges the movement destination of the transport instruction for the first transport vehicle 5A and the movement destination of the transport instruction for the second transport vehicle 5B assigned before the exchange determination with each other between the first transport vehicle 5A and the second transport vehicle 5B. That is, the transport vehicle controller 3 reassigns the transport instruction that designates the second station STb as the movement destination to the first transport vehicle 5A and reassigns the transport instruction that designates the first station STa as the movement destination to the second transport vehicle 5B.

As illustrated in State 4A and State 4B in FIG. 4, the first transport vehicle 5A having been reassigned with the transport instruction that designates the second station STb as the movement destination passes through the first station STa and stops at the second station STb. The first transport vehicle 5A executes a transfer operation receiving the FOUP from the second station STb. The second transport vehicle 5B having been reassigned with the transport instruction that designates the first station STa as the movement destination stops at the first station STa. The second transport vehicle 5B executes a transfer operation receiving the FOUP from the first station STa.

Note that in State 3A in FIG. 3, if the transport vehicle controller 3 determines that the second transport vehicle 5B assigned with the transport instruction that designates the second station STb as the movement destination is not present upstream of the first transport vehicle 5A assigned with the transport instruction that designates the first station STa as the movement destination, the first transport vehicle 5A stops at the first station STa based on the transport instruction and executes a transfer operation receiving the FOUP from the first station STa.

The following describes the effects of the transport vehicle system 1 of the above embodiment. The transport vehicle system 1 of the above embodiment exchanges the transport instructions between the first transport vehicle 5A and the second transport vehicle 5B and can thereby reduce the waiting time of the second transport vehicle 5B occurring when the above exchange control is not executed (that is, a time during which the second transport vehicle 5B waits behind the first station STa while the first transport vehicle 5A is executing the transfer operation receiving the FOUP from the first station STa). In addition, when the other transport vehicle 5 is further present behind the second transport vehicle 5B, the number of times of waiting of the transport vehicle 5 is reduced by one, and the transport efficiency of the entire transport vehicle system 1 further improves. Consequently, the transport efficiency of the transport vehicle system 1 can be improved.

The exchange determination by the transport vehicle controller 40 determines whether the second transport vehicle 5B destined to wait upstream of the first transport vehicle 5A until work by the first transport vehicle 5A is completed is present when the first transport vehicle 5A executes the transport instruction that designates the first station STa as the movement destination. This can eliminate a waiting time during a transfer operation in which the first transport vehicle 5A positioned ahead of the second transport vehicle 5B receives the FOUP from the station ST.

The transport vehicle controller 40, when determining that the second transport vehicle 5B is present upstream of the first transport vehicle 5A by the exchange determination, executes the exchange control even when the other transport vehicle 5 is present between the first transport vehicle 5A and the second transport vehicle 5B. This can execute the exchange control even when the second transport vehicle 5B is not positioned immediately behind the first transport vehicle 5A, and thus a searching range for the transport vehicle 5 to be exchanged can be expanded, and the transport vehicle 5 to be exchanged is easily found.

The certain position P is set to be a deceleration starting position for when the first transport vehicle 5A is to stop at the first station STa. This can stop the first transport vehicle 5A at the first station STa as it is when the second transport vehicle 5B to be exchanged is not present behind the first transport vehicle 5A. In addition, the time at which the exchange control is executed can be delayed until just before the first transport vehicle 5A can be stopped at the first station STa, and thus the second transport vehicle 5B is easily found. Furthermore, a processing load on the transport vehicle controller 40 can be reduced compared to the presence or absence of the second transport vehicle 5B is constantly determined.

Although one embodiment has been described, this disclosure is not limited to the above embodiment. Various changes can be made without departing from the appended claims.

The above embodiment has described an example in which the transport vehicles 5 are arranged in a queue behind the first transport vehicle 5A, but this is not limiting. For example, when a confluence point CP is present upstream of (behind) the first transport vehicle 5A, the transport vehicle controller 40 searches all the track 11 upstream of the confluence point CP to determine the presence or absence of the transport vehicle 5 to be the second transport vehicle 5B.

In FIG. 3 and FIG. 4 illustrating the above embodiment and the above modification, a branching point BP and the like are not present on the track 11 leading to the first station STa, but this is not limiting. In front and in the rear of the certain position P, a confluence point CP may be present or a branching point BP not illustrated may be present.

FIG. 3 and FIG. 4 illustrating the above embodiment and the above modification have illustrated an example in which two transport vehicles 5 are present between the first transport vehicle 5A and the second transport vehicle 5B, but this is not limiting. For example, between the first transport vehicle 5A and the second transport vehicle 5B, one transport vehicle 5 may be present or the transport vehicle 5 is not necessarily present.

The transport vehicle controller 40 of the above embodiment and the above modification has described an example in which the exchange determination is executed at the timing when the first transport vehicle 5A has reached the certain position P, but for example, the exchange determination may be executed regularly every T seconds. Thus, the transport vehicle controller 40 executes the exchange determination determining whether the second transport vehicle 5B is present when the transport vehicle 5 to be the first transport vehicle 5A reaches the certain position P within T seconds.

The above embodiment and modification have described an example in which the certain position P is set only at the most upstream first station STa of the arrangement of the stations ST, but this is not limiting. For example, when another station ST is present downstream of the second station STb, and the loading requests are desired to be exchanged between the second station STb and the other station ST, the certain position P of the second station STb is also set at the second station STb.

The above embodiment and modification have described an example in which the article is the FOUP, but the article may be a container such as a reticle pod storing glass substrates, a general component, or the like.

The transport vehicle system 1 of the above embodiment and modification have described the overhead transport vehicle 5 as an example of the transport vehicle, and other examples of the transport vehicle include unmanned transport vehicles traveling on a track laid on the ground or a support.

The technical subject of this disclosure can be described as follows:

[1] A transport vehicle system comprising: a plurality of transport vehicles configured to travel along a route set in advance in one direction and to transport an article, a plurality of stations provided along the route and configured to serve as a loading request source for the article and a controller configured to assign a transport instruction each time a loading request for the article occurs, the transport instruction designating a station being one of the plurality of stations having the loading request as a movement destination with respect to the transport vehicle capable of reaching the station having the loading request earliest, wherein the controller executes an exchange determination determining whether a second transport vehicle is present upstream of a first transport vehicle, the first transport vehicle being one of the plurality of transport vehicles assigned with a transport instruction that designates a first station being one of the plurality of stations as a movement destination, and the second transport vehicle being one of the plurality of transport vehicles different from the first transport vehicle and assigned with a transport instruction designating a second station being one of the plurality of stations disposed downstream of the first station as a movement destination, and executes an exchange control exchanging the movement destination of the transport instruction for the first transport vehicle and the movement destination of the transport instruction for the second transport vehicle assigned before the exchange determination with each other when determining that the second transport vehicle is present upstream of the first transport vehicle.

[2] The transport vehicle system according to [1], in which the exchange determination by the controller determines whether the second transport vehicle destined to wait upstream of the first transport vehicle until work by the first transport vehicle is completed is present when the first transport vehicle executes the transport instruction that designates the first station as the movement destination.

[3] The transport vehicle system according to [1] or [2], in which the exchange determination by the controller determines whether the second transport vehicle capable of starting a transfer operation at the first station while the first transport vehicle is performing a transfer operation at the second station is present when the movement destination of the transport instruction for the first transport vehicle and the movement destination of the transport instruction for the second transport vehicle assigned before the exchange determination are exchanged with each other.

[4] The transport vehicle system according to any one of [1] to [3], in which the controller executes the exchange control when determining that the second transport vehicle is present upstream of the first transport vehicle by the exchange determination even where another transport vehicle is present between the first transport vehicle and the second transport vehicle.

[5] The transport vehicle system according to any one of [1] to [4], in which the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

The invention claimed is:

1. A transport vehicle system comprising:

a plurality of transport vehicles configured to travel along a route set in advance in one direction and to transport an article;

a plurality of stations provided along the route and configured to serve as a loading request source for the article; and a controller configured to assign a transport instruction each time a loading request for the article occurs, the transport instruction designating a station being one of the plurality of stations having the loading request as a movement destination with respect to the transport vehicle capable of reaching the station having the loading request earliest, wherein the controller executes an exchange determination determining whether a second transport vehicle is present upstream of a first transport vehicle, the first transport vehicle being one of the plurality of transport vehicles assigned with a transport instruction that designates a first station being one of the plurality of stations as a movement destination, and the second transport vehicle being one of the plurality of transport vehicles different from the first transport vehicle and assigned with a transport instruction designating a second station being one of the plurality of stations disposed downstream of the first station as a movement destination, and executes an exchange control exchanging the movement destination of the transport instruction for the first transport vehicle and the movement destination of the transport instruction for the second transport vehicle assigned before the exchange determination with each other when determining that the second transport vehicle is present upstream of the first transport vehicle;

wherein the exchange determination by the controller determines whether the second transport vehicle capable of starting a transfer operation at the first station while the first transport vehicle is performing a transfer operation at the second station is present when the movement destination of the transport instruction for the first transport vehicle and the movement destination of the transport instruction for the second transport vehicle assigned before the exchange determination are exchanged with each other.

2. The transport vehicle system according to claim 1, wherein the controller executes the exchange control when determining that the second transport vehicle is present upstream of the first transport vehicle by the exchange determination even where another transport vehicle is present between the first transport vehicle and the second transport vehicle.

3. The transport vehicle system according to claim 1 wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

4. The transport vehicle system according to claim 1, wherein the controller executes the exchange control when determining that the second transport vehicle is present upstream of the first transport vehicle by the exchange determination even where another transport vehicle is present between the first transport vehicle and the second transport vehicle.

5. The transport vehicle system according to claim 1, wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

6. The transport vehicle system according to claim 1, wherein the controller executes the exchange control when determining that the second transport vehicle is present upstream of the first transport vehicle by the exchange determination even where another transport vehicle is present between the first transport vehicle and the second transport vehicle.

7. A transport vehicle system comprising:

a plurality of transport vehicles configured to travel along a route set in advance in one direction and to transport an article;

a plurality of stations provided along the route and configured to serve as a loading request source for the article; and a controller configured to assign a transport instruction each time a loading request for the article occurs, the transport instruction designating a station being one of the plurality of stations having the loading request as a movement destination with respect to the transport vehicle capable of reaching the station having the loading request earliest, wherein the controller executes an exchange determination determining whether a second transport vehicle is present upstream of a first transport vehicle, the first transport vehicle being one of the plurality of transport vehicles assigned with a transport instruction that designates a first station being one of the plurality of stations as a movement destination, and the second transport vehicle being one of the plurality of transport vehicles different from the first transport vehicle and assigned with a transport instruction designating a second station being one of the plurality of stations disposed downstream of the first station as a movement destination, and executes an exchange control exchanging the movement destination of the transport instruction for the first transport vehicle and the movement destination of the transport instruction for the second transport vehicle assigned before the exchange determination with each other when determining that the second transport vehicle is present upstream of the first transport vehicle;

wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

8. The transport vehicle system according to claim 7, wherein the controller executes the exchange control when determining that the second transport vehicle is present upstream of the first transport vehicle by the exchange determination even where another transport vehicle is present between the first transport vehicle and the second transport vehicle.

9. The transport vehicle system according to claim 7, wherein the exchange determination by the controller determines whether the second transport vehicle destined to wait upstream of the first transport vehicle until work by the first transport vehicle is completed is present when the first transport vehicle executes the transport instruction that designates the first station as the movement destination.

10. The transport vehicle system according to claim 9, wherein the controller executes the exchange control when determining that the second transport vehicle is present upstream of the first transport vehicle by the exchange determination even where another transport vehicle is present between the first transport vehicle and the second transport vehicle.

11. The transport vehicle system according to claim 9, wherein the controller executes the exchange control when determining that the second transport vehicle is present upstream of the first transport vehicle by the exchange determination even where another transport vehicle is present between the first transport vehicle and the second transport vehicle.

12. The transport vehicle system according to claim 9, wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

13. The transport vehicle system according to claim 9, wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

14. The transport vehicle system according to claim 7, wherein the exchange determination by the controller determines whether the second transport vehicle capable of starting a transfer operation at the first station while the first transport vehicle is performing a transfer operation at the second station is present when the movement destination of the transport instruction for the first transport vehicle and the movement destination of the transport instruction for the second transport vehicle assigned before the exchange determination are exchanged with each other.

15. The transport vehicle system according to claim 14, wherein the controller executes the exchange control when determining that the second transport vehicle is present upstream of the first transport vehicle by the exchange determination even where another transport vehicle is present between the first transport vehicle and the second transport vehicle.

16. The transport vehicle system according to claim 14, wherein the controller executes the exchange control when determining that the second transport vehicle is present upstream of the first transport vehicle by the exchange determination even where another transport vehicle is present between the first transport vehicle and the second transport vehicle.

17. The transport vehicle system according to claim 14, wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

18. The transport vehicle system according to claim 14, wherein the controller executes the exchange determination when the first transport vehicle assigned with the transport instruction that designates the first station as the movement destination reaches a certain position upstream of the first station, and the certain position is a deceleration starting position for when the first transport vehicle is to stop at the first station.

* * * * *